United States Patent Office 3,096,168
Patented July 2, 1963

3,096,168
SUSPENSIONS OF UREAFORM IN LIQUID MIXED FERTILIZERS
Charles E. Waters, Petersburg, and Rodney L. Wells, Chesterfield County, Va., assignors to Allied Chemical Corporation, New York, N.Y., a corporation of New York
No Drawing. Filed May 20, 1960, Ser. No. 30,450
4 Claims. (Cl. 71—28)

This invention relates to a liquid mixed fertilizer. More particularly, it relates to a liquid mixed fertilizer containing ureaform in suspension therein and to the process for preparing the suspension.

Liquid mixed fertilizers are solutions of compounds which, for the most part, are very soluble in water and that supply at least two or all three of the primary plant nutrients: Nitrogen, phosphorus measured as $P_2O_5$, and potash measured as $K_2O$. Although nitrogen-potash and phosphorus-potash solutions can be made, the present invention is directed primarily to solutions containing both nitrogen and $P_2O_5$, with or without potash.

Ureaform is a term which is used in the fertilizer art to denote mixtures of compounds of different degrees of solubility formed by the reaction of urea and formaldehyde under acid conditions, when the reaction mixture contains at least 1 mol of urea per mol of formaldehyde, and preferably more. The over-all solubility of this material is quite low so that the product does not form highly concentrated solutions that have a tendency to burn vegetation. Moreover, the nitrogen therein becomes available as a plant nutrient over a prolonged period of time so that unusually heavy applications of the material may be made without damaging or over-feeding plant life.

In view of these properties which make the use of ureaform in fetilizers highly desirable, fertilizer mixtures have been developed by the prior art in which the ureaform is present along with phosphorus and potassium, as well as other more soluble forms of nitrogen. These products are, however, all in the solid state. No one has heretofore proposed to include the ureaform in liquid fertilizers made by dissolving the more soluble forms of fertilizer components in water. Since these liquid fertilizers have an advantage in that they supply quickly available nutrients to plant life in a form in which it is readily assimilated, the liquid mixed fertilizer is of considerable commercial importance. However, its one disadvantage over the normal solid fertilizer is that it does not provide the plant life with any nutrients which will become available to the plant life over any protracted period of time.

It has been found that this disadvantage can be overcome by making a stable suspension of ureaform in a liquid mixed fertilizer. Such suspension has the advantage that one application will provide a supply of quickly available nutrients along with a reserve of slowly available nitrogen. Furthermore the suspended ureaform particles, upon being applied to the soil or lawn, will remain visible thereon and therefore serve as a visible indicator to show which parts of the area have been sprayed with the liquid fertilizer mixture and which still require treatment.

In accordance with this invention, it has been found that liquid mixed fertilizers containing suspended ureaform can be prepared by mixing specified proportions of water and soluble fertilizer ingredients and reacting therein 1–2.5 mols of urea per mol of formaldehyde under acidic conditions to form a ureaform product. After allowing this reaction to take place for a few minutes, a specified amount of ammonia or ammoniating solution is added to neutralize the mixture to a pH of 6 to 7. The proportions of ingredients used should be such that the density of the liquid medium of the final product will be about 1.1 g./ml. or higher, preferably 1.15–1.30 g./ml. This mixture is then preferably passed into a high-shear-type agitator to produce a more stable suspension.

It has furthermore been found that, if urea and formaldehyde are allowed to react under acidic conditions in the presence of part or all of the ingredients of a liquid mixed fertilizer, ureaform is produced in a dispersable form without the necessity of drying or separate processing. By the use of a high-shear-type agitator, a suspension of the ureaform in the solution is obtained that is stable for a week or more and is readily dispersed when partial settling does occur. The reaction components, however, should be controlled in order to obtain a quality product. It is particularly important that the urea-formaldehyde mol ratio and the density of the reaction mixture be held within specified limits.

The liquid mixed fertilizers which are particularly well adapted for this purpose are aqueous solutions containing highly soluble compounds of nitrogen and $P_2O_5$, with or without potassium salts. The $P_2O_5$ is commonly present as an ammonium phosphate composition equivalent to:

$$(NH_4)_{1.4-1.8}H_{1.6-1.2}PO_4$$

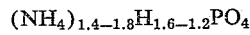

Although this composition can be made by dissolving solid monoammonium phosphate and diammonium phosphate in the proper proportions, large scale production is achieved more economically by partial neutralization of phosphoric acid with ammonia. Mol ratios in the range indicated above provide from 0.276 to 0.316 part (by weight) of nitrogen per part of $P_2O_5$. Additional nitrogen, if called for, is frequently supplied as urea, while potash is most often added as potassium chloride. Solutions made from these ingredients are described in I. Christoffel's U.S. Patent 2,814,556 of November 26, 1957. Other ingredients may be used also. Ammonium nitrate is very widely used as a source of part of the nitrogen, and ammonium sulfate is used to a small extent. There is also some use of potassium compounds other than the chloride, such as potassium sulfate or potassium hydroxide, the latter replacing part or all of the ammonia in the partial neutralization of phosphoric acid.

There are various methods for making ureaform, but all require the mixing of at least one mol of urea (usually substantially more than one mol) per mol of formaldehyde, followed by reaction, at least a portion of which takes place under acidic conditions. If a separate, salable product is desired, the solid is finally neutralized and dried. One method of making a highly desirable type of ureaform is described in U.S. Patent 2,644,806 of July 7, 1953, issued to Mearl A. Kise. However, in the process of the present invention, there is some variation from prior art ureaform processes. For example, in the present process a very high urea-formaldehyde reaction mol ratio (above 2.5) tends to produce ureaform compounds that are too soluble to form satisfactory suspensions.

According to the present invention, the making of the ureaform occurs as part of the process of making the liquid mixed fertilizer, and the over-all grade of the mixture includes the nitrogen, $P_2O_5$, and potash in solution, as well as the nitrogen in the undissolved part of the ureaform. In calculating the formulation, the amount of phosphoric acid (or equivalent ammonium phosphates) is chosen to give the desired $P_2O_5$ content, and enough ammonia is used to keep the ammonium phosphate composition within the limits mentioned herein before. Part or all of the additional nitrogen is supplied as urea, which will be partially converted to ureaform. The amount of formaldehyde carrier, usually aqueous formaldehyde or urea-formaldehyde concentrate, is such that the over-all ratio is about 1 to 2.5 mols of urea per mol of formaldehyde, preferably about 1.3 to 2.0 mols per mol of formaldehyde. Part of the nitrogen may be supplied in other forms, especially ammonium nitrate. The potash will usually be added as potassium chloride, though other potassium compounds may be used in special cases. Finally, the amount of additional water is such as will make the desired final formulation and density. The mixture also includes water added with the phosphoric acid and the formaldehyde, as well as water formed in the urea-formaldehyde reactions. Since it is important that no solid be present except finely divided ureaform, the formulation should provide enough water to hold all of the ingredients except the ureaform in solution down to the lowest temperature that will be encountered.

There is considerable latitude in the order of mixing the ingredients, but this order should be arranged so that the urea and formaldehyde are caused to react in the presence of part or all of the phosphoric acid, preferably at pH 2–4 and at a temperature below 45° C., and the final ammonium phosphate composition should be in the range $$(NH_4)_{1.4-1.8}H_{1.6-1.2}PO_4$$

except that if potassium hydroxide has been used it substitutes for an equivalent amount of ammonia. If the urea is added to a solution that contains all of the phosphoric acid, the formaldehyde carrier should be added promptly, and ammoniation should follow within a few minutes, in order to minimize hydrolysis of the urea.

Neutralization to about pH 6–7 is important to stabilize the ureaform and prevent formation of materials that are inactive by AOAC tests. After neutralization has been completed, the mixture is a slurry, with a finely divided precipitate suspended in solution. There is considerable tendency for the solid to separate, sinking or floating, depending upon the density of the solution phase. Only rarely does the solution have exactly the same specific gravity as the ureaform solids, and if this occurs in some cases it is at only one temperature. Suspending agents, such as carboxymethylcellulose, greatly lessen the rate of separation in such suspensions.

It has been found that violent agitation of a suspension of proper density produces a suspension that is stable for a week or more and permits easy redispersion, even without the use of a suspending agent. These stable suspensions normally have a density of about 1.1 g./ml. or higher, measured at 60° F. Satisfactory results have been achieved with a colloid mill in which the slurry is passed between a fixed and a rapidly moving surface separated by a few one-thousandths of an inch, preferably at most 0.006, and also with a machine that has a high-speed propeller rotating in the liquid, of the type referred to as a high-shear-type agitator such as a Waring Blendor. When the slurries have been so treated, the particles of the suspended ureaform will readily pass through a 200 mesh screen.

In the following examples, the UF Concentrate 85 is a commercial liquid formaldehyde-urea reaction product equivalent to 59.8% formaldehyde, 24.6% urea and 15.6% water (prepared by process of U.S. Patent 2,652,377).

Example 1

A 12–12–0 fertilizer was produced as follows: 25 parts of UF Concentrate 85 were mixed with 47.7 parts of urea and 5 parts of 85% phosphoric acid were added, with stirring. pH was about 2.5. After a precipitate had formed, 34.8 parts of diammonium phosphate, 20.2 parts of monoammonium phosphate, and 158.8 parts of water were added, and the whole was well mixed. pH was about 6.3. The calculated analysis was 12.0% nitrogen and 11.75% $P_2O_5$, with no potash. After it had been passed through a colloid mill at a spacing of 0.004 inch between the rotor and stator, the suspension remained stable. Urea:formaldehyde mol ratio used=1.8:1, density of product at 60° F. was about 1.18 g./ml. When a similar mixture having a 12–12–12 formulation was made in which 54.7 parts of potassium chloride were added and only 100 parts of water were used, a similarly stable suspension was obtained, but there was also some undissolved potassium chloride.

Example 2

Another 12–12–0 fertilizer was produced as follows: 25 parts of UF Concentrate 85 were mixed with 47.7 parts of crystal urea, and 5 parts of 85% phosphoric acid were added, with stirring. Formation of solids occurred within five minutes, converting the mixture to a pasty mass that had a pH of 2.5 at 32° C. Then 34.8 parts of diammonium phosphate, 20.2 parts of monoammonium phosphate, and 158.8 parts of water were added, and the whole was well mixed. The temperature fell to 22° C., and the pH rose to 6.2. After the mixture had been stirred for five minutes in a Waring Blendor, the temperature was 47° C. and the pH was 6.3. The product was a rather thick slurry with only a slight tendency to separation of a little clear liquid on top after several days. The density of the product, measured at 60° F., was approximately 1.18 g./ml. The product contained 12.38% nitrogen, including 1.80% water-insoluble nitrogen and 2.40% nitrogen present as unreacted urea. The activity index (A.I.) of the water-insoluble nitrogen was 41 according to a modification of the procedure given in paragraph 2.38 of the "Official Methods of Analysis of the Association of Official Agricultural Chemists," Eighth Edition, 1955. (The modification is described in the "Journal of the AOAC", vol. 42, No. 1, page 32 (1959).) In this preparation the mol ratio of urea to formaldehyde was 1.8:1.

Example 3

A 10–6–4 slurry-type fertilizer was made, starting with a solution of 173.4 parts of crystal urea, 108.5 parts of furnace-grade phosphoric acid (55.3% $P_2O_5$), and 64.5 parts of potassium chloride (62% $K_2O$ equivalent) in 502.1 parts of water. The formaldehyde, 127.8 parts of 37% solution, was added all at once, with stirring, a temperature of 45° C. being attained in two minutes. The pH was 1.0, indicating a highly acidic condition. A white precipitate formed. Five minutes after the addition of formaldehyde, introduction of gaseous ammonia was begun, and continued for three minutes, approximately 25 parts being added. The pH measured at 70° C. (the maximum temperature attained) was 6.5; after cooling to room temperature and violent agitation with the Waring Blendor it was 7.1. The density of the resulting thick suspension was 1.9 g./ml., measured at 60° F. This suspension contained 10.47% total nitrogen, including 4.45% water-insoluble nitrogen and 2.51% nitrogen present as unreacted urea. The activity index of the water-insoluble nitrogen was 20, indicating that an undesirably high proportion of the urea nitrogen had been converted to highly insoluble compounds. In this experiment the mol ratio of urea to formaldehyde was 1.82:1. A sample of clear liquid was obtained by centrifuging a portion of the suspension. The density of this liquid was approximately 1.18 g./ml. at 60° F., and the pH was 6.8.

Example 4

A 12–8–4 slurry-type fertilizer was made by a procedure like that described for Example 3. The initial solution contained 202.5 parts of crystal urea, 144.7 parts of furnace-grade phosphoric acid, and 64.5 parts of potassium chloride in 407.4 parts of water, and the added formaldehyde solution amounted to 149.2 parts. As in Example 2, the mol ratio of urea to formaldehyde was approximately 1.80 to 1. The maximum temperature caused by addition of the formaldehyde was 51° C. Addition of approximately 31.7 parts of ammonia required 9 minutes, and raised the pH to 6.50. As in the previous case, the suspension was not stable until it had been agitated in the high-shear-type agitator. A sample analyzed 12.02% total N, including 4.82% water-insoluble N and 2.70% free-urea N. Density of the product was 1.2 g./ml. at 60° F.

*Example 5*

Another 12-8-4 slurry-type fertilizer was made in which 92 parts of UF Concentrate 85 furnished all of the formaldehyde and part of the urea. The initial solution contained 179.8 parts of crystal urea, 144.7 parts of furnace-grade phosphoric acid, 64.5 parts of potassium chloride, and 613.2 parts of water. The maximum temperature caused by addition of UF Concentrate was 51° C. Ammoniation was carried out as in the preceding example, but the indicated final pH was 6.90. Again, agitation with the high-shear-type agitator was required to stabilize the suspension. The stabilized suspension analyzed 12.02% total N, including 5.62% water-insoluble N and 2.70% free-urea N. Density of the product was 1.2 g./ml. at 60° F. Urea: formaldehyde=1.84.

Although certain preferred embodiments of the invention have been disclosed for purpose of illustration, it will be evident that various changes and modifications may be made therein without departing from the scope and spirit of the invention.

We claim:

1. The method of preparing a liquid fertilizer containing a suspension of ureaform therein comprising reacting urea with formaldehyde in the ratio of 1 to 2.5 mols urea per mol formaldehyde in an aqueous phosphoric acid medium, neutralizing the phosphoric acid with ammonia to a pH lying within the range of 6 to 7, controlling the relative amounts of water and water-soluble ingredients of the mixture to achieve a density of the liquid medium of at least 1.1 g./ml. at 60° F., and subjecting the slurry so obtained to violent agitation in a high-shear-type agitator to produce a stable suspension of ureaform in a liquid fertilizer.

2. The method of preparing a liquid fertilizer containing a suspension of ureaform therein comprising reacting urea with formaldehyde in the ratio of 1 to 2.5 mols urea per mol formaldehyde in a phosphoric acid medium, at pH between about 2 and about 4 and at temperatures not above about 45° C.; adding diammonium phosphate and monoammonium phosphate in amounts which convert the phosphoric acid to ammonium phosphate with composition in the range $$(NH_4)_{1.4-1.8}H_{1.6-1.2}PO_4$$

and bring the liquid medium to a pH lying within the range of 6 to 7; controlling the relative amounts of water and water-soluble ingredients of the mixture to achieve a density of the liquid medium of at least 1.1 g./ml. at 60° F.; and subjecting the slurry so obtained to violent agitation in a high-shear-type agitator to produce a stable suspension of ureaform of particle size less than 200 mesh in a liquid fertilizer.

3. The method of preparing a liquid fertilizer containing a suspension of ureaform therein comprising reacting urea with formaldehyde in the ratio of 1 to 2.5 mols urea per mol formaldehyde in an aqueous phosphoric acid medium containing potassium chloride; neutralizing the phosphoric acid with ammonia to form an ammonium phosphate with composition in the range $$(NH_4)_{1.4-1.8}H_{1.6-1.2}PO_4$$

and obtain a liquid medium having a pH lying within the range of 6 to 7; controlling the relative amounts of water and water-soluble ingredients of the mixture to achieve a density of the liquid medium of at least 1.1 g./ml. at 60° F.; and subjecting the slurry so obtained to violent agitation in a high-shear-type agitator to produce a stable suspension of ureaform in a liquid fertilizer.

4. The method of preparing a liquid fertilizer containing a suspension of ureaform therein comprising reacting urea with formaldehyde in the ratio of 1 to 2.5 mols urea per mol formaldehyde in an aqueous phosphoric acid medium, neutralizing the phosphoric acid with ammonia to a pH lying within the range of 6 to 7, controlling the relative amounts of water and water-soluble ingredients of the mixture to achieve a density of the liquid medium of at least 1.1 g./ml. at 60° F., and passing the slurry so obtained through a colloid mill at a spacing less than 0.006 between the rotor and stator to produce a stable suspension of ureaform in a liquid fertilizer.

References Cited in the file of this patent

UNITED STATES PATENTS

| | | |
|---|---|---|
| 2,255,026 | Keenen et al. | Sept. 2, 1941 |
| 2,255,027 | Keenen et al. | Sept. 2, 1941 |
| 2,618,546 | Davenport | Nov. 18, 1952 |
| 2,625,471 | Mowry et al. | Jan. 13, 1953 |
| 2,766,283 | Darden | Oct. 9, 1956 |
| 2,864,685 | Waters et al. | Dec. 16, 1958 |
| 2,919,183 | Christoffel | Dec. 29, 1959 |
| 2,955,930 | Kealy | Oct. 11, 1960 |
| 2,958,594 | Halpern et al. | Nov. 1, 1960 |
| 3,022,153 | Miller | Feb. 20, 1962 |